United States Patent
Pavlik, Jr.

(10) Patent No.: US 6,763,683 B2
(45) Date of Patent: Jul. 20, 2004

(54) METHOD FOR PURE, FUSED OXIDE

(75) Inventor: Robert S. Pavlik, Jr., Corning, NY (US)

(73) Assignee: Corning Incorporated, Corning, NY (US)

(*) Notice: Subject to any disclaimer, the term of this patent is extended or adjusted under 35 U.S.C. 154(b) by 287 days.

(21) Appl. No.: 10/045,236

(22) Filed: Oct. 23, 2001

(65) Prior Publication Data

US 2003/0082089 A1 May 1, 2003

(51) Int. Cl.⁷ .............................. C03B 5/14; C03B 5/43
(52) U.S. Cl. ................ 65/27; 65/468; 65/374.13; 423/336; 423/337
(58) Field of Search ................ 423/336, 337; 501/106; 65/374.13, 27, 168, 171, 173, 413, 414, 421; 422/240; 110/336, 338

(56) References Cited

U.S. PATENT DOCUMENTS

| | | | |
|---|---|---|---|
| 2,239,551 A | 4/1941 | Dalton et al. | 65/33 |
| 2,272,342 A | 2/1942 | Hyde | 65/21.5 |
| 4,231,994 A | * 11/1980 | MacDonald | 423/70 |
| 4,361,542 A | * 11/1982 | Arendt | 423/81 |
| 4,619,817 A | * 10/1986 | Stambaugh et al. | 423/266 |
| 5,043,002 A | 8/1991 | Dobbins et al. | 65/3.12 |
| 5,332,702 A | 7/1994 | Sempolinski et al. | 501/106 |
| 5,395,413 A | 3/1995 | Sempolinski et al. | 65/414 |
| 6,174,509 B1 | 1/2001 | Pavlik, Jr. et al. | 423/337 |
| 6,574,991 B1 | 6/2003 | Pavlik, Jr. et al. | |

* cited by examiner

Primary Examiner—Ngoc-Yen Nguyen
(74) Attorney, Agent, or Firm—Timothy M. Schaeberle; James V. Suggs

(57) ABSTRACT

A method and furnace are described for producing a fused oxide body by decomposing a precursor compound of the oxide in a flame to form molten oxide particles and collecting those particles in a furnace constructed of a refractory material to form a fused oxide body, the improvement in the method comprising treating the refractory material with a strong acid in liquid form to react with, and thereby remove, contaminants from at least the surface of the refractory material.

7 Claims, 1 Drawing Sheet

METHOD FOR PURE, FUSED OXIDE

This application is related to U.S. Pat. No. 6,174,509 issued Jan. 16, 2001 entitled PURE FUSED SILICA, FURNACE AND METHOD, by R. S. Pavlik, Jr., D. R. Sempolinski and M. R. Wasilewski.

FIELD OF THE INVENTION

A furnace and method for producing an article of relatively pure, fused oxide.

BACKGROUND OF THE INVENTION

Relatively pure, metal oxides are produced by thermal decomposition of precursors and deposition of the resulting oxides. The precursor may take the form of a vapor, or may be carried by a vapor. It may be decomposed by either flame hydrolysis or pyrolysis.

One such process is production of fused silica by hydrolysis or pyrolysis of silicon tetrachloride. Early patents disclosing such processes for producing silica are U.S. Pat. Nos. 2,239,551 (Nordberg) and 2,272,342 (Hyde). A commercial application of flame hydrolysis involves forming and depositing particles of fused silica to form large bodies (boules). Such boules may be used individually, or may be finished and integrated together into large optical bodies, such as telescope mirrors. In this procedure, $SiCl_4$ is hydrolyzed, and the hydrolyzed vapor is passed into a flame to form molten particles of fused silica. The particles are continuously deposited on a bait, or in a crucible, known as a cup, to form a boule.

Other fused, metal oxide materials are known, of course, but fused silica has achieved major commercial significance. The present disclosure, therefore, refers, generically, to "fused metal oxides," but is primarily concerned with fused silica. However, a modification, designed to achieve a near-zero coefficient of thermal expansion, is composed of about 93% $SiO_2$ and 7% $TiO_2$. The term, "fused silica," then includes such compositions where silica is the dominant oxide, and where the physical properties are closely related.

A serious drawback, in such a process for producing a metal oxide from the corresponding chloride, has been the need to dispose of the HCl byproduct in an environmentally safe manner. Accordingly, it has been proposed, in U.S. Pat. No. 5,043,002 (Dobbins et al.), to employ a halide-free, silicon-containing compound as a substitute for $SiCl_4$. In particular, the patent proposes using a polymethylsiloxane, such as octamethylcyclotetrasiloxane, to provide the vaporous reactant for the hydrolysis or pyrolysis process.

In order to introduce a substitute precursor, it is, of course, critically necessary to avoid any significant change in the properties of the fused silica product. Unfortunately, the substitution proposed by the Dobbins et al. patent did lead to significant property changes. One such change was a reduction in UV transmission properties. Another was development of fluorescence in the glass that increased when the glass was exposed to short wavelength radiation.

Studies revealed that a major factor in the transmission loss was sodium ion content in the glass. U.S. Pat. Nos. 5,332,702 and 5,395,413 (Sempolinski et al.) describe remedial measures taken to reduce the sodium ion content. In particular, it was found necessary to use dispersants, binders and water relatively free of sodium ions in producing zircon refractory components for the furnace. Essentially, these measures provided a purer zircon refractory. This refractory was used in constructing the furnace in which the fused silica was deposited to form a boule.

An improved product was obtained by adopting the practices prescribed in the Sempolinski et al. patents. However, attempts to use the fused silica in certain applications made it apparent that further improvements were necessary to meet the critical requirements of these applications. One such application is lenses designed for transmission of very short, UV-wavelength radiation from an excimer type laser. This laser emits radiation at about 193 nm and 248 nm wavelengths.

It was found that lenses produced from available fused silica did not provide acceptable transmission of the short wavelength radiation, and exhibited an undesirable fluorescence. Both of these conditions tend to become worse with service time. The loss of transmission, or darkening of the glass, is commonly referred to as UV absorption damage.

Improvement in the zircon refractory, as disclosed in the Sempolinski et al. patents, alleviated the affect of sodium ion contamination in a fused silica article. However, it was then found that, in addition to sodium, other contaminants also exist in the furnace refractory in damaging amounts. These include the alkaline earth metals, and transition metals, such as iron, titanium and lead, aluminum, phosphorous and sulfur.

These metal contaminants have varying degrees of volatility at temperatures in excess of 1650° C., the temperature at which fused silica is deposited. Thus, they may be present in the furnace atmosphere, and become entrapped in the fused silica as it is deposited. The presence of these contaminating metals in a fused silica lens results in a reduction of the transmittance capability of the glass. It also results in development of an undesirable fluorescence in the glass. These deficiencies continue to further develop as the lens is subjected to short wavelength, UV radiation in service.

There are inherent variations in the metal impurity levels in a refractory material, as well as varying degrees of metal volatility. This makes it difficult to control glass quality in a collection furnace for fused silica, or even to obtain acceptable glass frequently. The problem becomes particularly acute when a polysiloxane is used as a precursor material for the fused silica. As explained in the Sempolinski et al. patents, the self-cleansing action of the HCl by-product from a $SiCl_4$ decomposition is lost with the siloxane precursor.

Contaminating metals can be present in the raw materials employed in production of furnace refractories. The metals may also be entrained during sintering of the refractory, or during any subsequent operations, such as sawing or grinding. Zircon is a relatively clean refractory, particularly when prepared as described in the Sempolinski et al. patents. However, the superior transmission properties required for such demanding uses as microlithography applications require control of all metal contaminants at a level below 100 parts per billion (ppb).

Comparative studies have revealed that the required degree of contaminating metal control in a collection furnace can be achieved by constructing the furnace from refractory materials containing less than 300 parts per million (ppm) of the contaminating metals.

In an effort to achieve this degree of purity, two procedures have been developed. One involves constructing at least a portion of the collection furnace, in particular the crown, from refractory materials that have been exposed to a reactive, halogen-containing gas. The gas reacts with, and thereby cleanses, the refractory of contaminating metals. This process is described in greater detail, and claimed, in U.S. Pat. No. 6,174,509 issued Jan. 16, 2001 (Pavlik, Jr. et al.).

In general, the process entails exposing the refractory brick to a reactive, halogen-containing gas at a temperature of 700–1500° C. Conveniently, this can coincide with firing of the refractory brick. In particular, it is convenient that the treatment occur as the fired refractory is being cooled, for example, at a temperature of about 1200° C.

The other procedure, commonly referred to as "carbochlorination," also involves treatment at an elevated temperature in the range of 1000–1500° C. The treatment may be carried out in a graphite vessel having a bed of loose carbon. The vessel also has means for evacuation, and for controlling input and exhaust of treatment gases, particularly chlorine.

Both procedures are effective to reduce the presence of contaminating metals, particularly sodium and iron, in a metal oxide, refractory body, such as zircon. However, both procedures involve the use of environmentally unfriendly materials in a gas form at greatly elevated temperatures.

It would, therefore, be desirable to provide a procedure that lends itself more readily to control. The present invention is the result of research aimed at meeting this need.

SUMMARY OF THE INVENTION

The invention resides in part in a method of producing a fused oxide body by decomposing a precursor compound of the oxide in a flame to form molten oxide particles that are collected to form a fused oxide body in a furnace constructed of a refractory material, the improvement in the method comprising treating the refractory material with a strong acid in liquid form to react with, and thereby remove, contaminants from at least the surface of the refractory material.

The invention further resides in a refractory furnace for collecting fused oxide particles to form a solid oxide body, at least a portion of the furnace being constructed with a refractory brick from which contaminants have been removed by treatment of the brick in an acid bath.

BRIEF DESCRIPTION OF THE DRAWING

The single FIGURE in the accompanying drawing is a schematic representation of an apparatus and process for depositing a large body of fused oxide, such as silica.

DESCRIPTION OF THE INVENTION

Figure 1:
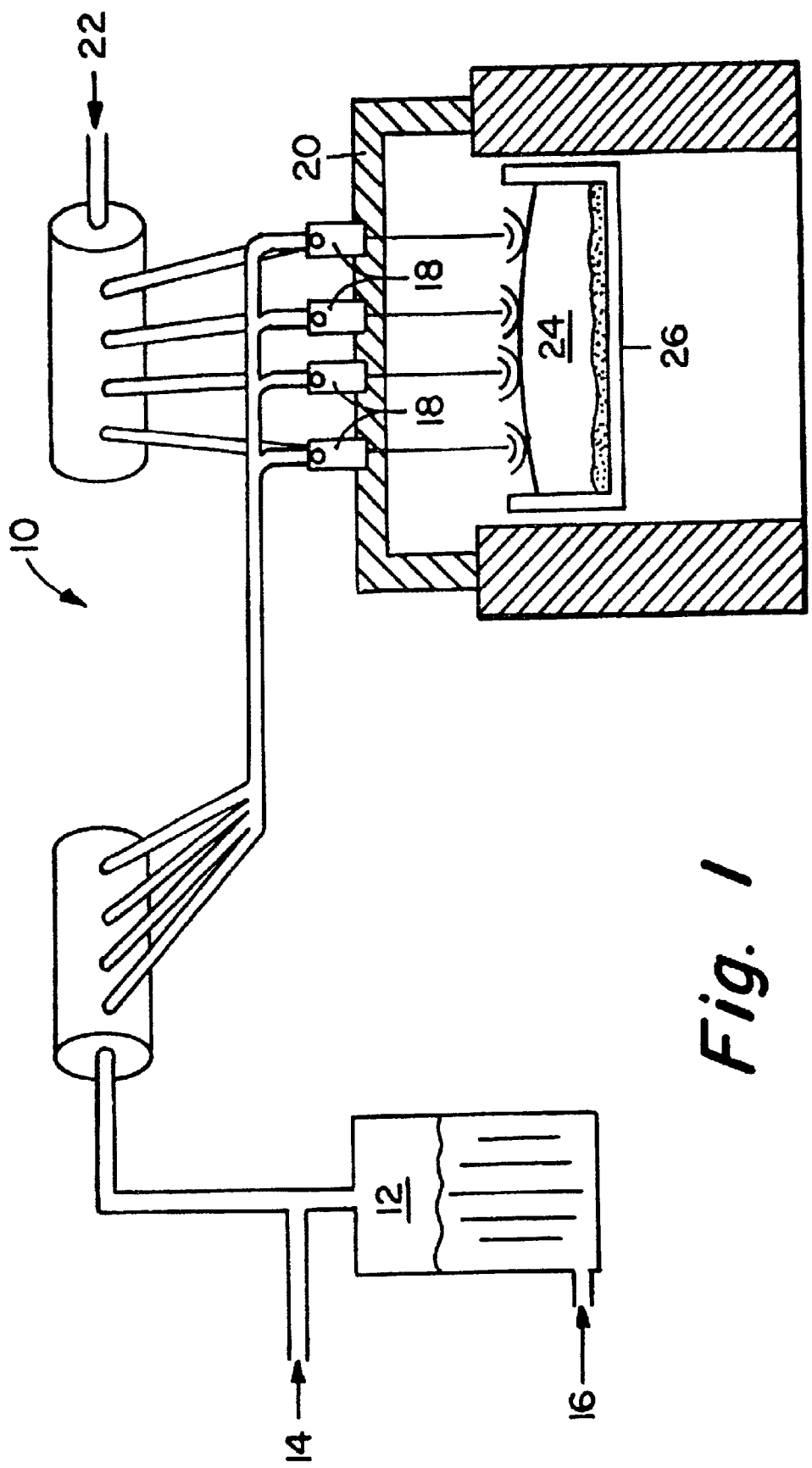

The present invention is generally applicable to a method of, and a furnace for, producing a fused metal oxide body wherein molten oxide particles are produced, and are collected, in a furnace constructed of refractory material. However, the present invention was developed in connection with research on improved methods and refractory materials for use in collecting fused silica particles. Accordingly, the invention will be described with respect to the collection of fused silica particles to form a fused silica body.

FIG. 1 in the accompanying drawing is a schematic representation of an apparatus and process for producing and depositing molten silica particles to build up a large, fused silica boule. The apparatus, generally designated by the numeral 10, includes a feedstock source 12. Nitrogen, or a nitrogen/oxygen mixture, is used as the carrier gas. A bypass stream of nitrogen 14 is introduced to prevent saturation of the vaporous stream. The vaporous reactant is passed through a distribution mechanism to the reaction site wherein a number of burners 18 are present in close proximity to a furnace crown 20. The reactant is combined with a fuel/oxygen mixture 22 at these burners, and is combusted and oxidized to deposit silica at a temperature greater than 1600° C. High purity, metal oxide soot and heat are directed downwardly from the refractory furnace crown 20. The silica is immediately deposited and consolidated to a non-porous mass 24 on hot cup 26.

As pointed out above, considerable effort has been expended in reducing the degree of metal impurities in zircon refractory materials. This has culminated, primarily, in two purification processes. One involves exposure of the refractory to a reactive, halogen gas; the other to a procedure referred to as "carbochlorination." Both processes have been used effectively in reducing metal contamination, and thereby improving glass quality.

However, the use of lower wavelength, UV sources has led to an ever-increasing demand for higher purity fused silica. This, in turn, requires purer facilities for producing the fused silica. Also, use and disposal of a halogen atmosphere at high temperature becomes increasingly difficult as environmental standards increase.

In an effort to alleviate these problems, experiments were conducted in which refractory brick were soaked in an acid bath. Three strong acids were employed, nitric ($HNO_3$), hydrochloric (HCl) and hydrofluoric (HF). Refractory brick (zircon) were soaked in a bath of each acid at temperatures ranging from 20–80° C. These experiments determined that such low temperature treatment could be effective in removing contaminants by an etching action. While a higher temperature bath was generally more effective, it was also more difficult to use. X-ray photoelectron spectroscopy (XPS) studies were made on a narrow surface zone of the etched brick (5–30 A°). This determined whether, and to what extent, contaminants were removed.

Initial experiments were conducted on untreated brick, that is brick as made. While the impurity level, particularly sodium, was greatly reduced, it quickly became apparent that, for some purposes, the acid soak would not be sufficient. Therefore, further testing was carried out on samples that had previously been subjected to a carbochlorination process.

A carbochlorination treatment furnace may be a graphite containment vessel that has at least one vacuum/gas treatment inlet/outlet. This allows for a vacuum to be pulled within the sealed vessel. It also permits the controlled input and output of treatment gases, such as chlorine, helium, hydrogen and mixtures thereof.

Preferably, the furnace vessel for carbochlorination treatment includes a particulate/powder carbon bed, such as a graphite, carbon black powder. This provides an appropriate level of carbon to be present in the furnace for carbochlorination of the refractory members. The treatment furnace includes an appropriate heating source, such as inductive heating elements or electrical, resistive heating elements. The interior and contents of the vessel can be thus heated to an elevated reaction temperature in the range of 1000 to 1500° C., to carbochlorinate the contents. Impurities are removed from the refractory members by reaction with the treating agent. Impurities are also treated and reacted with the elemental carbon in the furnace to reduce metal contaminants in the refractories.

A preferred carbochlorination cleaning treatment includes loading the refractory members into the treatment furnace having a carbon bed. The furnace temperature is elevated to a reaction temperature range of 1000 to 1500° C. (preferably at least 1200° C.). Meanwhile, a vacuum is pulled and maintained for a time that allows appropriate carbon reaction with oxides present. Then a chlorine treatment gas is repeatedly fed into the vessel. Chlorine gas treatment exposures are about 30 to 60 minutes between chlorine, feed-in shots, preferably with 2 to 5 of the 30 to 60 minute exposures done at the elevated reaction temperature. The chlorine gas treatment atmosphere may comprise 2.5 to 20% $Cl_2$ with the balance of the treatment atmosphere helium.

After such chlorine treatment, a vacuum is again pulled while maintaining the temperature. In the preferred practice, this carbochlorination treatment of vacuum-chlorine-vacuum is repeated at least one more time to ensure proper carbochlorination cleansing of the refractory members. After the final vacuum pulling treatment, the treatment vessel and contents are preferably swept with a gas, such as helium or hydrogen. After the carbochlorination cleansing, further processing and handling of the refractories members is minimized before assembling into the furnace, crown and cup. The carbochlorinated, refractory brick members of the invention provide high purity fused silica having UV transmissions at KrF 248 nm of at least 99.9%/cm, and at least 99.3%/cm at ArF 193 nm.

The acid etching treatment may either precede or follow the carbochlorination treatment. Generally, however, it is more effective as a post treatment, that is on a brick previously subjected to a carbochlorination treatment. Therefore, further description is confined to acid treatment of brick that have been initially purified by a carbochlorination treatment as described above.

Purification by carbochlorination increases the amounts of these surface species: Zr, Si and O. Measurements suggest that the surface of the purified sample is zirconium- and silica-rich compared to the unpurified sample. Purification decreases the amounts of the following surface species: C, N, Na, F, Mg, and Al. These results suggest that the purification process removes trace elements from the surface.

The increased amounts of Si and O at the surface after purification is probably due to preferential removal of trace impurities. A Si-rich surface after purification suggests that silica may have been removed from the bulk, and re-condensed to some extent on the surface.

Etching the purified sample once in nitric acid resulted in increased levels of the following surface species: Zr, Si and O. Decreased levels of the following surface species were observed: C, N and Na. The removal of sodium (Na) from the surface is important, since sodium is highly detrimental to the fused silica product. Sodium in furnace-refractory materials often leads to more sodium in the glass and, consequently, lower ultra-violet transmission.

Zircon bricks, purified by carbochlorination, were etched at room temperature in 10% HCl and 10% HF acids for 24 hours. The samples were surveyed by XPS. Results are given in TABLE I. In the Table, "purified" indicates values after a carbochlorination treatment and $\Delta$ indicates the change after acid etching.

TABLE I

| Sample | Zr | Si | C | O | F | Al | Ca | Cl |
|---|---|---|---|---|---|---|---|---|
| Purified | 11.2 | 15.9 | 6.1 | 65.7 | ND | 1.2 | Trace | |
| Purified & etched in HCl | 12.3 | 13.4 | 9.0 | 62.0 | 2.5 | 0.9 | Trace | Trace |
| Δ (PE-P) | +1.1 | −2.5 | +2.9 | −3.7 | +2.5 | −0.3 | | Trace |
| Purified & etched in HF | 13.0 | 12.6 | 9.2 | 58.0 | 6.6 | 0.6 | | |
| Δ (PE-P) | +1.8 | −3.3 | +3.1 | −7.7 | +6.6 | −0.6 | Trace | — |

The carbochlorinated surface, after etching in HCl, showed more of the following surface species: Zr, C, F and possibly Cl. Increased chlorine and fluorine surface species were probably due to contamination by the acid. These species undoubtedly evolve during thermal treatment in subsequent processing, and carbon oxidizes. A decrease in the following surface species was observed after etching: Si, O and Al.

The carbochlorinated surface, after etching in HF, showed more of the following surface species: Zr, C and F. Increased fluorine at the surface was probably a result of contamination by the acid.

A decrease in the following surface species was observed after etching: Si, O, Al and possibly Ca. HF was more effective in removing Si and Al from the surface compared to HCl. In general, HF was effective in removing at least some of the surface contamination on brick purified by carbochlorination.

Semi-quantitative spectrographic (chemical) analysis was performed on the samples listed in TABLE I. The semi-quantitative, spectrographic analysis results showed that HF was effective in removing Al from purified brick.

Nitric acid was tested by soaking a brick, purified by carbochlorination, for four hours in a bath of acid. The surface was then analyzed, and the brick again soaked for ten hours. This second etching step did not appear to provide an adequate improvement in surface quality to warrant the effort.

In summary, acid-etching at room temperature with nitric, hydrochloric and hydrofluoric acids removed impurities from the surfaces of zircon samples purified by a carbochlorination process. HF was more effective than HCl in removing impurities from purified, zircon brick.

I claim:

1. In a method of producing a fused oxide body by decomposing a precursor compound of the oxide in a flame to form molten oxide particles that are collected to form a fused oxide body in a furnace constructed of a zircon refractory material, the improvement in the method comprising treating the zircon refractory material with a strong acid in liquid form to react with, and thereby remove, contaminants from at least the surface of the zircon refractory brick.

2. The method of claim 1 wherein the improvement comprises treating the zircon refractory brick with an acid selected from the group consisting of nitric, hydrochloric and hydrofluoric acids.

3. The method of claim 2 wherein the selected acid is hydrofluoric acid.

4. The method of claim 1 wherein the improvement comprises treating the zircon refractory brick in an acid bath maintained at a temperature in the range of 20–80° C.

5. The method of claim 1 wherein the fused oxide body is a fused silica body.

6. The method of claim 1 which comprises treating the zircon refractory brick with an acid in liquid form either prior to or after a carbochlorination treatment.

7. The method of claim 1 which comprises treating the zircon refractory brick with an acid in liquid form after a carbochiorination treatment.

* * * * *